Oct. 1, 1968 R. N. MODJESKI 3,403,825
DISPENSER FOR FLUENT SOLID MATERIAL
Filed April 24, 1967 3 Sheets-Sheet 1

Richard N. Modjeski,
Inventor.
Koenig, Senniger,
Powers and Leavitt,
Attorneys.

Oct. 1, 1968     R. N. MODJESKI     3,403,825
DISPENSER FOR FLUENT SOLID MATERIAL

Filed April 24, 1967     3 Sheets-Sheet 2

United States Patent Office 3,403,825
Patented Oct. 1, 1968

3,403,825
DISPENSER FOR FLUENT SOLID MATERIAL
Richard N. Modjeski, Evergreen Park, Ill., assignor to UMC Industries, Inc., St. Louis, Mo., a corporation of Delaware
Filed Apr. 24, 1967, Ser. No. 632,968
12 Claims. (Cl. 222—232)

ABSTRACT OF THE DISCLOSURE

A dispenser for use in a vendor for dispensing a fluent solid material, such as ground coffee, comprising a material-containing hopper having an aperture in its bottom positioned above a variable throw metering chamber. The chamber includes a spiral spring and manually operable gear means for coiling and uncoiling the spring to vary the effective volume thereof. A closure is provided for the aperture and a shutter for the exit end of the metering chamber. An electric drive operates the closure and shutter for alternately covering and uncovering the aperture and exit end of the metering chamber to dispense the material contained therein.

Background of the invention

The invention is in the field of dispensers, and more particularly dispensers for dispensing a fluent solid material in vendors. An example of this is a coffee vendor having a device for storing a quantity of ground coffee and for delivering a measured portion (a "throw") of ground coffee for brewing a single cup of coffee during each vend cycle. In such vendors, it is desirable to provide means whereby the throw may be varied in accordance with such factors as the type of coffee being used, the characteristics of the local water supply, and the local preference as to strength of the brewed coffee, so as to assure customer satisfaction.

Summary of the invention

Accordingly, among the several objects of the present invention may be noted the provision of a fluent solid material dispenser, particularly for coffee, in which the throw may be infinitely varied within limits; and the provision of a dispenser of the class described which is characterized by simplicity of construction, low cost and ease of operation and use. Other objects and features will be in part apparent and in part pointed out hereinafter.

Briefly, a dispenser constructed in accordance with the present invention comprises a hopper having a bottom with an aperture therein, the hopper being adapted to hold a quantity of fluent solid material to be dispensed. Below the aperture is a metering chamber. In the chamber is a spiral spring adapted to be coiled and uncoiled to vary the effective volume thereof. A closure is provided for the aperture and a shutter is provided for the bottom of the chamber.

Brief description of the drawings

Corresponding reference characters indicate corresponding parts throughout the several views of the drawings.

Description of the preferred embodiment

The present dispenser is described in connection with a coffee vendor for dispensing a measured quantity (a "throw") of ground coffee to be delivered to a brewer. It should be understood, however, that the dispenser may be used to dispense any fluent solid material, and may be utilized in other types of vendors or wherever a fluent solid material dispenser may be required.

Figure 2:
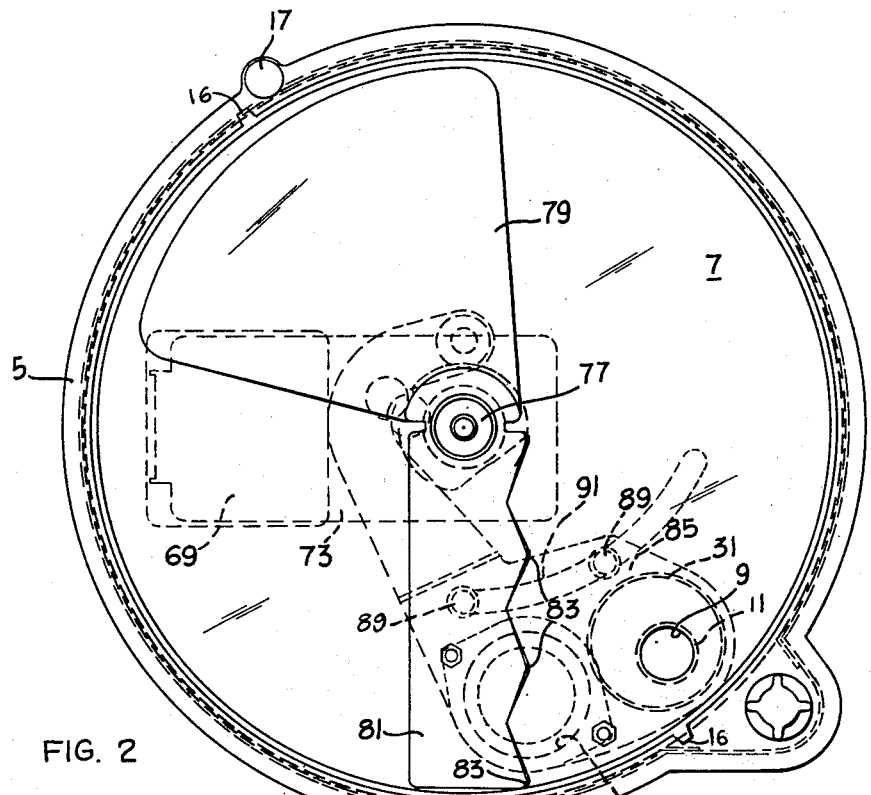
FIG. 2 is a section on line 2—2 of FIG. 1.
Figure 1:
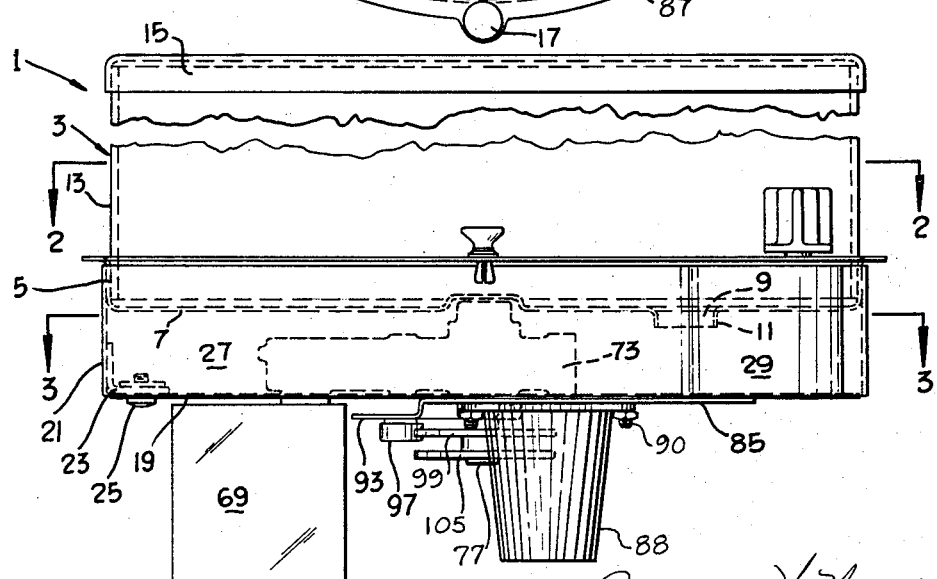
FIG. 1 is a side elevation of the present dispenser, with part of the hopper broken away.

Referring to FIGS. 1 and 2 of the drawings, a dispenser 1 of this invention is shown to comprise a hopper 3 for holding a quantity of the fluent solid material to be dispensed. The hopper 3 consists of a shallow cup-shaped receptacle 5 having a bottom plate 7 with an aperture 9 therein. The aperture 9 is provided with a downwardly projecting circumferential flange 11, the purpose of which will be hereinafter set forth. The hopper 3 further comprises a cylindrical container 13 received within the receptacle 5 and having a lid 15. The cylindrical container 13 is secured to the receptacle 5 by a plurality of fasteners 17. A circular base plate 19 is secured to the receptacle 5 below the bottom plate 7 by an annular depending flange 21 and a plurality of L-shaped brackets 23 and fasteners 25. The base plate 19 is provided with an aperture 20. A compartment 27 is therefore formed between the bottom plate 7 of the receptacle 5 and the base plate 19.

Figure 3:
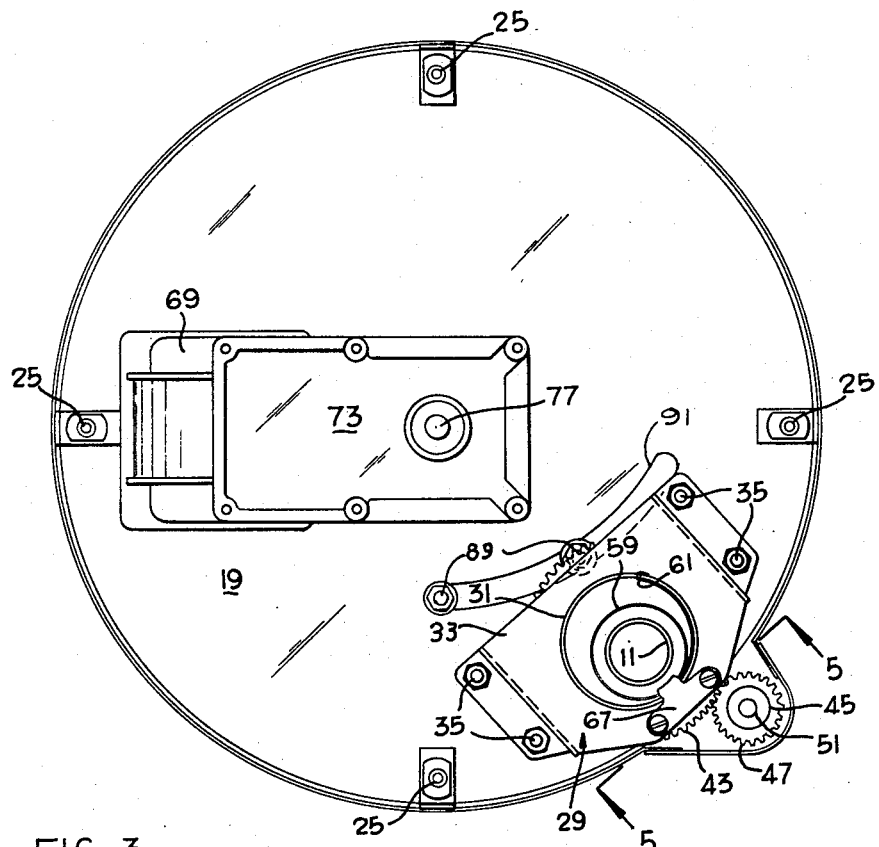
FIG. 3 is a section on line 3—3 of FIG. 1.
Figure 4:
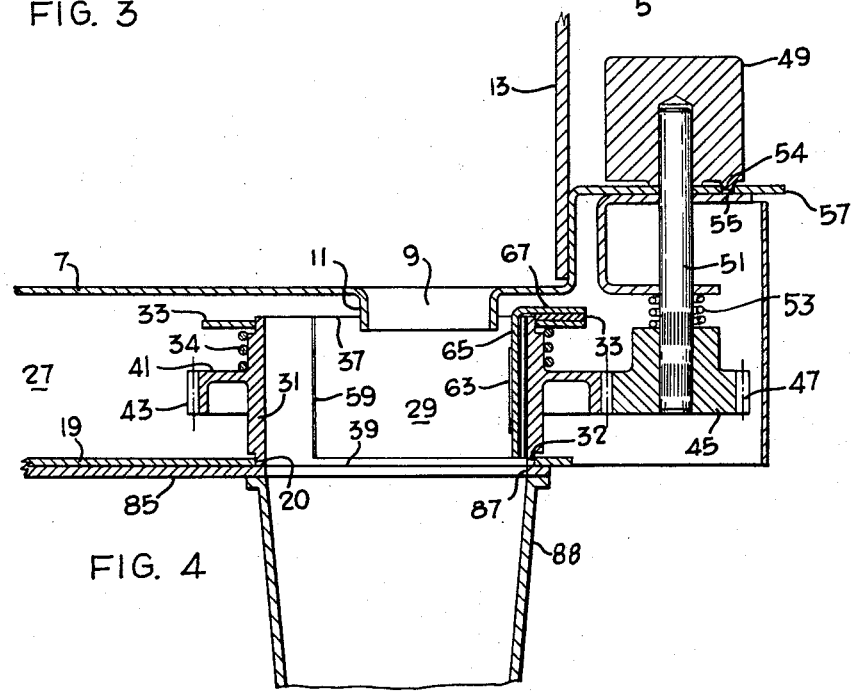
FIG. 4 is a partial section showing the metering chamber of the dispenser.
Figure 5:
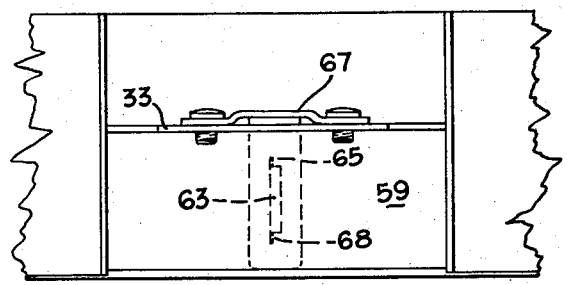
FIG. 5 is a section on line 5—5 of FIG. 3.

Means is provided within the compartment 27 below the bottom plate 7 of the hopper defining a variable-throw metering chamber 29. As best illustrated in FIGS. 3 and 4, this metering chamber means includes an annular rotatably mounted collar 31 having a lip 32 seated within the aperture 20, the collar being restrained from upward vertical movement by a plate 33 and a coil spring 34. A plurality of threaded fasteners 35 secure the plate 33 to the base plate 19. The metering chamber 29 has an upper entrance end 37 surrounding the flange 11 of aperture 9 and a lower exit end 39. An annular ring gear 41 having gear teeth 43 is formed on the periphery of the collar 31 for engagement by the teeth 47 of a spur gear 45. A manually operable knob 49 is secured to the spur gear 45 by a serrated shaft 51. Knob 49 is provided with a plurality of discrete positions of adjustment by a tension spring 53 which urges a protuberance 54 on the lower face of knob 49 into engagement with a plurality of apertures 55 formed in a flange 57 extending from the bottom plate 7. A spiral spring 59 is provided in collar 31, the inner convolution of the spring 59 defining the actual metering chamber 29. One end 61 of the spiral spring 59 is secured to the annular collar 31 for movement therewith while the other end 63 is fixed to a depending finger 65 formed on a bracket 67 secured to plate 33. As illustrated in FIG. 5, the end 63 of the spring 59 is hooked in a slot 68 formed in finger 65. Therefore, as the knob 49 is rotated, the spiral spring 59 is caused to either coil or uncoil to respectively decrease or increase the effective volume of the metering chamber 29.

A gearmotor comprising an electric motor 69 carried beneath the base plate 19 and a gear box 73 mounted in the compartment 27 is secured to the base plate 19 by a plurality of fasteners 71. An output shaft 77 of the gear box 73 rotates about the vertical axis of the dispenser 1 in response to energization of the electric motor 69. As best illustrated in FIG. 2, a sector-shaped closure blade 79 is secured to the shaft 77 within the receptacle 5 adjacent the bottom plate 7 for rotation with the shaft 77. The closure 79 is adapted to cover and uncover the aperture 9 in the bottom plate 7 of receptacle 5 for controlling the flow of material from the hopper 3 to the metering chamber 29. In addition, an agitator blade 81 having a plurality of upwardly projecting tines 83 is secured to the shaft 77 for rotation within the receptacle 5 to agitate or stir the material stored therein.

Figure 6:
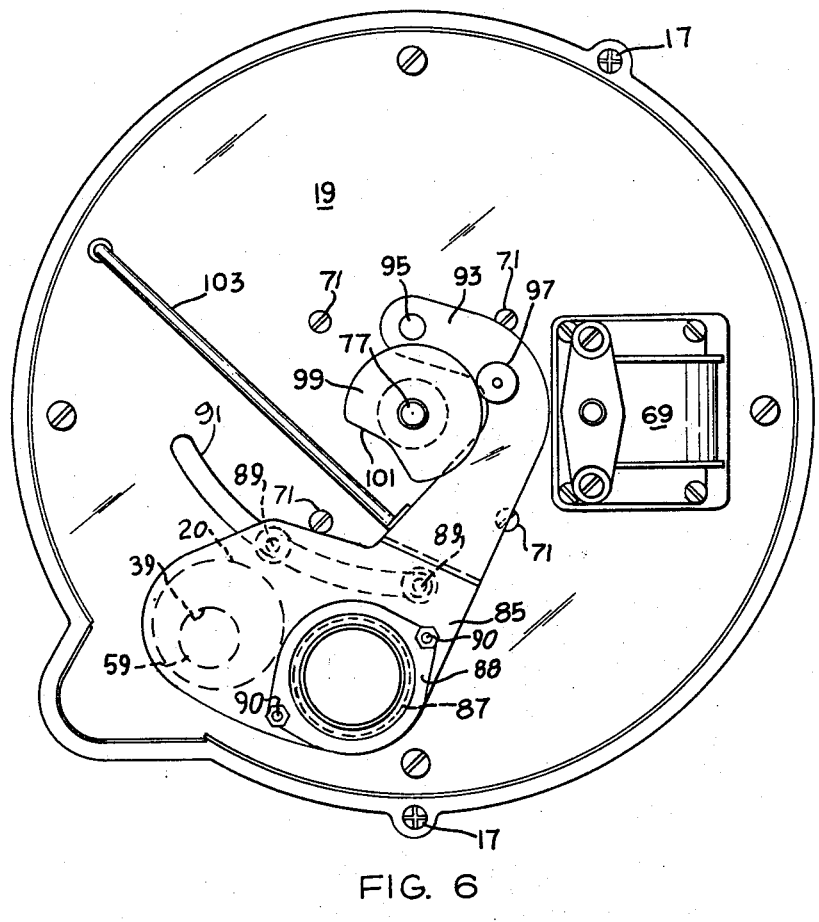
FIG. 6 is a bottom view of the dispenser.

As best illustrated in FIG. 6, a shutter blade 85 is mounted for movement on the bottom of base plate 19 adjacent the chamber exit end 39. The shutter blade 85 has an aperture 87. A funnel 88 is secured to shutter blade 85 in alignment with aperture 87 by a pair of fasteners 90. A pair of pins 89 extend up from the shutter 85 through an arcuate slot 91 in the plate 19, and a curved arm portion 93 of the shutter is pivotally mounted on plate 19 by a pivot pin 95. A cam follower 97 is mounted on the elbow of the shutter for engagement with a cam 99 having a recess 101, the cam being secured to the shaft 77 for rotation therewith. A spring 103 connected between the shutter 85 and the base plate 19 biases the shutter for engagement of the cam follower 97 with the cam 99. The arrangement is such that, upon rotation of the shaft 77 and cam 99, the shutter 85 is caused to swing from the position illustrated in FIG. 6 wherein the exit end 39 of the chamber 29 is covered, to the position illustrated in FIG. 4 wherein the exit end 39 is uncovered by registry of aperture 87 therewith.

As illustrated in FIG. 1, a second cam 105 is secured to the shaft 77 for engaging a cam follower operated electric switch (not shown) for controlling the operation of electric motor 69. The cam 105 is configured such that the electric motor 69 is deenergized upon completion of a single revolution of the shaft 77.

In operation of the dispenser 1 of the present invention, the hopper 3 is filled with the fluent solid material to be dispensed, such as ground coffee. The knob 49 is rotated in one direction or the other to increase or decrease the amount of material to be dispensed. As the knob 49 is rotated, the shaft 51, spur gear 45, ring gear 41 and annular collar 31 are rotated. Rotation of the annular collar 31 causes the end 61 of the spiral spring 59 to move and coil or uncoil the inner convolution thereof, thereby either increasing or decreasing, depending upon the direction of rotation of the knob 49, the effective volume of the metering chamber 29. After the desired setting is obtained on knob 49, the dispenser 1 is in a condition for dispensing throws of desired volume of the material from hopper 3 each time the electric motor 69 is energized. This may be accomplished, for example, by a mechanism connected to a vendor coin acceptor for completing a power supply circuit to the electric motor 69. When the electric motor 69 is energized, the shaft 77 is rotated through the reduction gearing 73 causing the closure 79 and agitator 81 to rotate. The shutter 85 remains in position closing the bottom of the metering chamber until the cam follower 97 on the shutter plate arm 93 drops into the recess 101 in the cam. When this occurs, closure 79 has rotated to a position wherein it covers aperture 9 and shutter 85 is caused to swing on the bottom of base plate 19 to uncover the chamber exit end 39 by registry of aperture 87 therewith. The quantity of material stored within the chamber 29, as determined by the volume of the inner convolution of spiral spring 59, is then free to fall through the aperture 87 and funnel 88 to the brewer of the vendor.

On continued rotation of the shaft 77 and cam 99, the shutter 85 is returned to its initial position wherein exit end 39 is covered. The closure 79 is simultaneously rotated to a position wherein the aperture 9 is uncovered to permit the metering chamber 29 to again fill with the material from hopper 3. The cam 105 then actuates the cam operated switch to interrupt the power supply to the motor 69 and deenergize the same. It should be noted that closure 79 and shutter 85 alternately cover and uncover aperture 9 and chamber exit end 39. That is, when shutter 85 uncovers chamber exit end 39 to dispense the material contained therein, closure 79 covers aperture 9 to prevent the material in hopper 3 from falling through the chamber 29 and aperture 87, and when shutter 85 covers chamber exit end 39, closure 79 uncovers aperture 9 to fill chamber 29 with the material in hopper 3. Since the metering chamber 29 is full at the completion of a cycle, the dispenser 1 is in a condition for immediate operation by the next vendee to operate the vendor.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A dispenser for fluent solid material comprising: a hopper having a bottom aperture, said hopper being adapted to hold a quantity of fluent solid material to be dispensed; means defining a metering chamber mounted below the bottom of said hopper, said means having an upper entrance in alignment with said aperture and a lower exit, said means including a spiral spring adapted to be coiled and uncoiled to vary the effective volume of said chamber; closure means for covering and uncovering said hopper bottom aperture; and shutter means for covering and uncovering said exit, whereby the quantity of fluent solid material dispensed may be varied by varying the effective volume of said chamber.

2. A dispenser as in claim 1 wherein the volume defined by the inner convolution of said spiral spring constitutes the effective volume of said chamber.

3. A dispenser as in claim 2 wherein one end of said spring is secured to a movable member for movement therewith and the other end of said spring is fixed, said movable member being mounted for movement for effecting said coiling and uncoiling of the spring.

4. A dispenser as in claim 3 wherein said movable member comprises an annular rotatably mounted collar having a gear on the outer periphery thereof, and means including a gear in meshing engagement with said gear on the collar.

5. A dispenser as in claim 1 wherein said closure and shutter means are adapted for movement by a common shaft for alternately covering and uncovering said aperture and chamber exit, and means for rotating said shaft.

6. A dispenser as in claim 5 further comprising an agitator blade secured to said shaft for agitating the fluent solid material in said hopper upon rotation of said shaft.

7. A dispenser as in claim 5 wherein said closure means comprises a sector-shaped blade mounted for rotation within said hopper adjacent its bottom, and said shutter means comprises a shutter blade having an aperture therein, the shutter blade being mounted for movement from a first position wherein said blade covers the chamber exit to a second position wherein said blade uncovers the chamber exit by registry of the aperture in the shutter blade therewith.

8. A dispenser as in claim 7 wherein said shaft is provided with a cam, and said shutter blade is provided with a cam follower, said cam follower engaging said cam for moving said shutter blade upon rotation of said shaft.

9. A dispenser for fluent solid material comprising: a cylindrical hopper having a bottom plate with a first aperture therein, said hopper being adapted to hold a quantity of fluent solid material to be dispensed; a base plate secured to said hopper below said bottom plate for forming a compartment therebetween, said base plate having a second aperture therein; a variable throw metering chamber mounted within said compartment, said chamber having an entrance end in alignment with the first aperture and an exit end in alignment with the second aperture, a spiral spring mounted in said chamber and having an inner convolution in alignment with said entrance and exit ends, one end of said spring being mounted for movement and the other end being fixed, and means for moving said one end for coiling and uncoiling said spring to vary the effective volume of said chamber; a closure mounted for movement within said hopper adjacent said bottom plate for covering and uncovering said first aperture; a shutter mounted for movement on said base plate for covering and uncovering said chamber exit end; and means for moving said closure and shutter for alternately covering and uncovering said first aperture and chamber exit end.

10. A dispenser as in claim 9 wherein said hopper consists of a cup-shaped receptacle having a cylindrical container received therein.

11. A dispenser as in claim 9 wherein said means for moving said one end of said spring comprises an annular collar having a peripheral ring gear formed thereon, said one end of said spring being secured to said collar, and manually operable means including a spur gear for rotating said ring gear and collar to effect said coiling and uncoiling of said spring.

12. A dispenser as in claim 9 wherein said means for moving said closure and shutter comprises a motor carried on the bottom of said base plate, a reduction gear box mounted on the top of said base plate in said compartment, said gear box being driven by and secured to said motor, a gear box output shaft extending through said base and bottom plates, said closure being secured to said shaft for rotation therewith, said shaft having a cam thereon for engaging a follower on said shutter for moving the latter, and means carried by said shaft for deenergizing said motor upon completion of a single revolution of said shaft.

References Cited

UNITED STATES PATENTS

| | | | |
|---|---|---|---|
| 895,489 | 8/1908 | Morse | 222—239 |
| 1,472,112 | 10/1923 | Barrows | 222—438 |
| 2,102,948 | 12/1937 | Francist | 222—239 X |

ROBERT B. REEVES, *Primary Examiner.*

N. L. STACK, *Assistant Examiner.*